Patented Nov. 1, 1927.

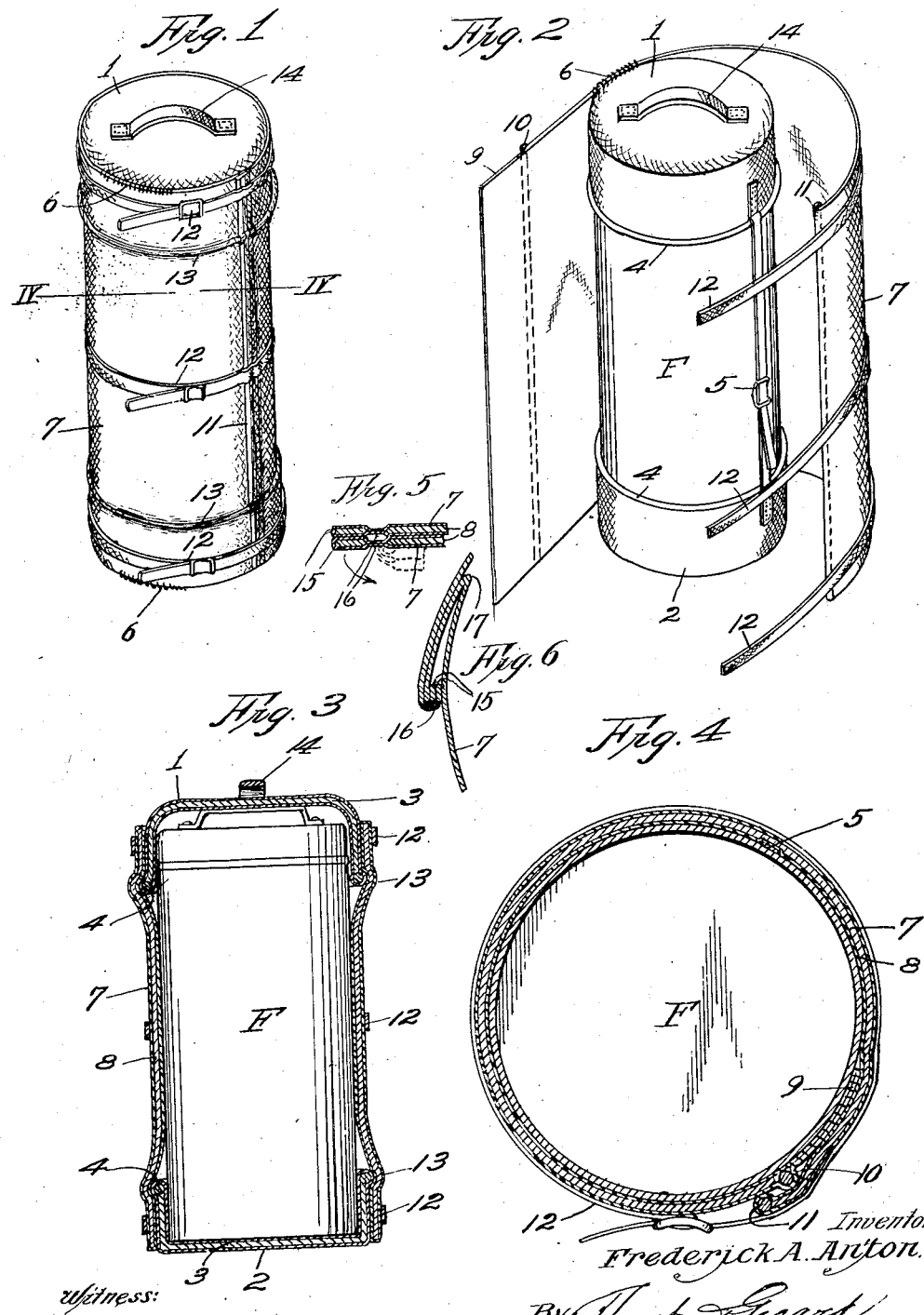

1,647,169

UNITED STATES PATENT OFFICE.

FREDERICK A. ANTON, OF TOPEKA, KANSAS.

SANITARY FREEZER CONTAINER.

Application filed July 13, 1925. Serial No. 43,195.

This invention relates to ice-cream freezer containers of that class for preserving the cream in good condition for a period of a few hours without ice. The conventional type of container is of fabric or the like and cylindrical in form and after the freezer is inserted, the upper portion of the container is folded over the top of the freezer and fastened. This type of container is objectionable on the score of cost of manufacture and expense of handling, and also because it is almost impossible to keep it in sanitary condition. The objections specifically enumerated are that it must of necessity be largely made by hand and the services of two persons are required to secure a freezer in or remove it from the container, as one person cannot well handle a heavy freezer and at the same time hold the container upright in expanded condition for the reception of the freezer. Again, when the top portion is unfastened to expose the freezer, one person cannot well remove the latter, especially if the fit is tight as is usually the case. In removing the freezer the top thereof is frequently dislodged, and the operator's hands, in gripping the upper ends of the body of the freezer, contaminate or may contaminate the cream, and it sometimes occurs that when the cream has melted at the top, from standing too long, a part of the soft or melted cream is spilled into the container and in time, will sour and hence render it unsanitary.

My objects are to produce a container which can be largely a machine product of low cost, which is susceptible of being easily applied to or removed from a freezer by one operator; which can be folded to small compass for storage or reshipment, and on which there is little likelihood of cream being spilled, as full access to the top of the freezer cannot be had until the latter is almost wholly exposed and easily removable from the container.

With these general objects in view, the invention consists in certain novel and useful features of construction and organization of parts as hereinafter described and claimed; and in order that it may be fully understood, reference is to be had to the accompanying drawing, in which:

Figure 1 is a perspective view of an ice cream freezer container embodying one form of the invention.

Figure 2 is a similar view but with the body portion of the container in opened condition.

Figure 3 is a vertical section of the container as inclosing an ice cream freezer.

Figure 4 is an enlarged horizontal section on the line IV—IV of Figure 1.

Figure 5 shows a fragment of a second form of the container, in horizontal section.

Figure 6 is a diagrammatic view illustrative of how the vertical edges of the container of the type shown by Figure 5, are secured together in air-tight relation.

In the said drawing, 1 and 2 indicate bottom and top cylindrical caps arranged in relatively inverted relation, that is with their chambered sides facing each other. These caps are preferably of canvas, duck or other strong and durable fabric. There are preferably two or more layers of the fabric and an interposed lining 3 of material having insulating properties, and the free edges of the cap walls are preferably beaded as at 4. The caps have a strap and buckle connection 5, whereby they can be fastened securely over the bottom and the removable top of an ice cream freezer F.

The caps 1 and 2 respectively, are also hingedly attached by stitching or otherwise as at 6, at their lower and upper extremities to the body portion or blanket 7 so as to be capable of up and down movement relative to the said blanket, which is of area to slightly more than encircle the freezer, and like the caps, is preferably composed of multiple thicknesses of fabric and is made air tight by a suitable lining of insulating material, as at 8. By preference the hinge attachment to the caps is made nearer one side margin of the body portion than the other, and at such margin, in Figures 1 to 4 inclusive, is an extension flap 9, which is adapted to underlie the other margin and preferably lacks insulated lining so as to lie more smoothly against the body of the freezer and avoid unnecessary bulk or thickness at the point of overlap. The upper and lower margins of the body portion overlap the beaded edges of the upper and lower caps when wrapped tightly around the freezer, and at the vertical margins the body portion is beaded at 10 and 11, the width of the wrapper being preferably such that when tightly wrapped, the beads 10 and 11 shall, under the pull or retraction tendency of the material, have an interlocked relation, that is, shall press laterally against each other and thereby not only distribute the strain over the entire wrapper but also tend to prevent vertical contraction and wrinkling thereof.

At each end and at one intermediate point by preference, there is a strap and buckle attachment 12 for the body portion or blanket, for encircling the freezer and not only securing the body portion or blanket closely thereon, but also by the end straps, above and below the beaded edges respectively of the upper and lower caps so as to guard against any possibility of the latter where not directly attached to the body portion, from pulling or working from under the ends thereof, it being clear that when said end straps are tightly buckled, they bow the body portion tightly over the beaded edges of the caps as shown at 13, and thus insure a relation which is perfectly air tight, and in conjunction with the similar action where the beads 10 and 11 interlock, provided a container which insulates the freezer so effectually that the cream, previously frozen to aproximately zero temperature, will be found in good serviceable condition for several hours where exposed to summer temperature.

One operator can apply the container to or remove it very quickly from the freezer. He first deposits the freezer in the bottom cap, and then slips the top cap over the freezer and clamps them firmly in place by the strap and buckle connection 5, this connection incidentally serving to secure the freezer cap against working upward. He then spreads the extension smoothly against the freezer and draws the other end of the body portion tightly around the freezer and over the extension until the beaded edges 10 and 11 overlap and interlock as explained, and secures the body portion in such position by the strap and buckle connections 12. The reverse manipulation is followed to permit the freezer to be removed, and in neither case is it necessary to open the latter, nor is any force applied tending to effect such result accidentally. The top cap may be equipped with a handle 14 for convenience in moving the freezer about, or such handle can be applied at any other suitable point of the container.

In the other construction for making airtight the connection between the vertical edges of the body portion or blanket, I provide the extreme vertical edges thereof with vertical strips 15 of insulation, spaced as at 16, from the main section 8 of the insulation so that the body portion or blanket can be bent or folded at the inner edges of such strips. With this type of construction the strip-containing edges of the body portion or blanket will be brought flatly together (see Figure 5) as the freezer is inclosed, and then the body portion or blanket will be folded to bring the said strips while thus folded together, flatly against the body portion or blanket inward of the line of such fold (see dotted lines Figure 5). One end of the body portion or blanket is then again folded as at 17, on a vertical line inward of the free vertical edges of the folded strip-containing portion so that the blanket can be drawn snugly or closely around the freezer and produce a vertical joint or seam impenetrable by air. The point of the last-mentioned fold line will be determined of course by the amount of slack in the blanket between the folded edges thereof and the freezer. In Figure 6, the blanket is indicated disproportionately large to produce excessive slack and hence permit the method of folding to be more clearly shown. The straps 12 at the upper and lower ends are necessary to secure the fold or seam thus made, and for precautionary purposes it is also desirable, although not indispensable, to employ the middle strap 12 also.

In other respects than those shown and described, the last-mentioned form of blanket may be identical with that first described and illustrated by Figures 1 to 4 inclusive, and the mode of applying the blankets is the same in both cases except in the method of producing the air-tight joint between the vertical edges.

From the above description, it will be apparent that I have produced a device of the character described which possesses all the features of advantage set forth as desirable; and while I have described and claimed the preferred embodiment of the same, I reserve the right to make all changes properly falling within the spirit and scope of the appended claims.

I claim:

1. A container for ice cream freezers comprising a pair of opposed flexible caps having side walls and a flexible body portion to be wrapped around a freezer and arranged in overlapping relation with the walls of the caps and hingedly attached at its upper and lower edges to the top and bottom caps respectively, to provide for relative up and down movement of said caps, and means for fastening the body portion and caps when upon a freezer, in air-tight relation to the latter.

2. A container for ice cream freezers comprising a pair of opposed flexible caps having side walls, a flexible body portion arranged in overlapping relation with the walls of the caps and hingedly attached at its upper and lower edges to the top and bottom caps respectively, to provide for relative up and down movement of said caps, and means to fasten the body portion in air-tight relation to the caps, and its side edges, between the caps, in overlapping and air-tight relation to each other.

3. A container for ice cream freezers comprising an upper cap and an inverted lower cap both of flexible construction and adapted respectively to fit over the upper and lower ends of a freezer, each cap having a continuous external bead at the free edge of its wall, a flexible body portion fitting in overlapping relation with the walls of the caps, the upper edge of the body portion being hingedly connected to the upper portion of the top cap and the lower edge correspondingly attached to the lower portion of the lower cap, the points of attachment being vertically alined and intermediate the side edges of said body portion, and means for fastening the body portion in overlapping relation with the beaded edges of the caps, and with its side edges in overlapping and air-tight relation at and between the beaded edges of said caps.

4. A container for ice cream freezers comprising a pair of flexible caps for fitting over the upper and lower ends of a freezer, a flexible body portion arranged to be wrapped around the freezer and the walls of the caps and hingedly attached at its upper and lower edges to the upper and lower portions of the upper and lower caps respectively, the body portion near one side edge having an external vertical bead and at its opposite side edge an internal vertical bead and being adapted at the internal-bead edge to overlap the opposite edge and the bead thereof, and means to fasten the body portion in air-tight relation to the caps and its vertical interlocked beaded edges in air-tight relation to the freezer.

5. A container for ice cream freezers comprising an upper flexlbie cap and a lower inverted flexible cap, a take-up connection detachably connecting the caps together, a flexible body portion adapted to be wrapped around the wall portions of the caps and a freezer fitted therein, the body portion being hingedly connected at its upper and lower edges respectively, to the upper portion of the upper cap and the lower portion of the lower cap, the hinge connections being vertically alined and at the opposite sides of the caps from said take-up connection, and means for fastening the flexible body portion around the walls of the caps and the freezer with an air-tight connection.

6. A container for ice cream freezers, comprising an upper flexible cap having a side wall for fitting over the top of a freezer and a lower inverted flexible cap having a side wall for receiving the bottom portion of the freezer, a flexible body portion in overlapping relation to the walls of the caps and adapted to be wrapped around said walls and the freezer and hingedly connected at its upper and lower edges to said caps respectively; said body portion being provided at one vertical edge with a flexible extension to be interposed between its other edge and the caps and freezer when the body portion is encircling the latter, and fastening devices fitting around the ends of the body portion where said ends overlap the walls of the caps and at a point intermediate said ends.

7. A container for ice cream freezers comprising a pair of opposed flexible insulated caps having side walls for fitting over the top and bottom of a freezer, a flexible insulated body portion in overlapping relation to the caps at its ends and attached thereto respectively at its upper and lower extremities, and provided at one vertical edge with a flexible extension to be interposed between its other edge and the caps and freezer when the body portion is encircling the latter, and fastening devices fitting around the body portion between the caps and where it is in overlapping relation with the caps.

In witness whereof I hereunto affix my signature.

FREDERICK A. ANTON.